United States Patent
Chien et al.

(10) Patent No.: US 9,584,223 B2
(45) Date of Patent: Feb. 28, 2017

(54) DIGITAL GENERATION OF MULTI-CARRIER OPTICAL SIGNALS

(71) Applicant: ZTE (USA) Inc., Morristown, NJ (US)

(72) Inventors: Hung-Chang Chien, Bridgewater, NJ (US); Zhensheng Jia, Morganville, NJ (US); Jianjun Yu, Basking Ridge, NJ (US)

(73) Assignee: ZTE (USA) Inc., Austin, TX (US)

( * ) Notice: Subject to any disclaimer, the term of this patent is extended or adjusted under 35 U.S.C. 154(b) by 188 days.

(21) Appl. No.: 14/302,333

(22) Filed: Jun. 11, 2014

(65) Prior Publication Data

US 2014/0363159 A1    Dec. 11, 2014

Related U.S. Application Data

(60) Provisional application No. 61/833,703, filed on Jun. 11, 2013.

(51) Int. Cl.
    *H04B 10/04* (2006.01)
    *H04B 10/50* (2013.01)
    *H04B 10/516* (2013.01)
    *H04B 10/548* (2013.01)

(52) U.S. Cl.
    CPC ....... *H04B 10/506* (2013.01); *H04B 10/5165* (2013.01); *H04B 10/548* (2013.01)

(58) Field of Classification Search
    CPC .. H04B 10/516; H04B 10/508; H04B 10/548; H04B 10/506; H04B 10/5165; H04B 10/505; H04B 10/532; H04J 14/02; H04J 14/06

USPC ....... 398/183, 188, 184, 185, 186, 187, 192, 398/193, 194, 195, 196, 197, 198, 199, 398/200, 201, 158, 159, 76, 43, 79, 65, 398/152

See application file for complete search history.

(56) References Cited

U.S. PATENT DOCUMENTS

| | | | | |
|---|---|---|---|---|
| 7,693,429 B1 * | 4/2010 | Lowery | ............... | H04B 10/548 398/182 |
| 8,798,471 B2 * | 8/2014 | Gaete | .................. | H04L 27/2096 398/182 |

OTHER PUBLICATIONS

Bosco, G., et al, "Performance Limits of Nyquist-WDM and CO-OFDM in High-Speed PM-QPSK Systems," IEEE Photonics Technology Letters, 22(15):1129-1131, Aug. 2010.

Chien, H.-C., et al, "Digital Generation of Dual 30Gbaud Image-Reject Sidebands on a Single Wavelength," submitted to 39th European Conference and Exhibition on Optical Communication (ECOC 2013), 4 pages.

Chien, H.-C., et al, "Performance Assessment of Noise-Suppressed Nyquist-WDM for Terabit Superchannel Transmission," Journal of Lightwave Technology, 30(24):3965-3971, Dec. 2012.

(Continued)

*Primary Examiner* — Hanh Phan
(74) *Attorney, Agent, or Firm* — Perkins Coie LLP

(57) ABSTRACT

A transmitter of optical signals uses a single light transmitter to modulate a multi-carrier signal. The multi-carrier signal is generated by performing digital signal processing in the digital domain to generate a plurality of components by performing Hilbert transform filtering. The components are modulated on to an optical transmitter as in-phase and quadrature components, thereby generating a multi-carrier waveform using a single optical transmitter.

15 Claims, 16 Drawing Sheets

(56) References Cited

OTHER PUBLICATIONS

Jia, Z., et al., "Field Transmission of 100 G and Beyond: Multiple Baud Rates and Mixed Line Rates Using Nyquist-WDM Technology," Journal of Lightwave Technology, 30(24):3793-3804, Dec. 2012.

Li, J., et al., "Approaching Nyquist Limit in WDM Systems by Low-Complexity Receiver-Side Duobinary Shaping," Journal of Lightwave Technology, 30(11):1664-1676, Jun. 2012.

Yu, J., et al., "Field Trial Nyquist-WDM Transmission of 8x216.4Gb/s PDM-CSRZ-QPSK Exceeding 4b/s/Hz Spectral Efficiency," IEEE Optical Fiber Communication Conference and Exposition (OFC/NFOEC), and the National Fiber Optic Engineers Conference, Los Angeles, CA, Paper PDP5D.3 (1-3), Mar. 2012.

* cited by examiner $F_b$: Symbol Rate; $2F_c$: Channel Spacing; $\beta$: roll-off factor

US 9,584,223 B2

DIGITAL GENERATION OF MULTI-CARRIER OPTICAL SIGNALS

CROSS REFERENCE TO RELATED APPLICATIONS

This patent document claims the benefit of U.S. Provisional Patent Application No. 61/833,703, filed on Jun. 11, 2013. The entire content of the before-mentioned patent application is incorporated by reference as part of the disclosure of this document.

BACKGROUND

This patent document relates to digital communication, and, in one aspect, multi-carrier optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which operational and capital expenditure can be reduced.

SUMMARY

The present document discloses techniques for generating multi-carrier optical signals using digital signal processing techniques in the electrical domain. Each modulated carrier can be used to power one commercial optical channel. In one example embodiment, a digital to analog conversion (DAC)-enabled dual 30 Gbaud image-reject sidebands signal generated on a single wavelength is described. The generated signal achieves performance below the SD pre-FEC BER limit, a back-to-back optical signal to noise ratio (BTB OSNR) of 15 dB was achieved for a 30 Gbaud polarization modulation quadrature phase shift keying (PM-QPSK) sideband at 4 bits/s/Hz.

In one aspect, a method of transmitting a multi-carrier optical signal includes generating a single sideband signal representation of information to be transmitted, wherein the information to be transmitted includes multiple independent data channels, performing digital signal processing on the single sideband signal representation to generate a plurality of modulation signal components, wherein each modulation signal component is located either at the positive frequency or at the negative frequency, separating the plurality of modulation signal components into real-part and imaginary-part signals, modulating the real-part and imaginary-part signals onto a wavelength by using a single optical modulator to generate a modulated multi-carrier signal in an optical domain such that each carrier carries one of the multiple independent data channels, and transmitting the modulated multi-carrier signal to communicate the information to be transmitted is disclosed.

In another aspect an apparatus for transmitting multi-carrier optical signals is disclosed. The apparatus includes a single sideband generation module that generates a single sideband signal representation of information to be transmitted, wherein the information to be transmitted includes multiple independent data channels, a digital signal processor that generates a plurality of modulation signal components, each modulation signal component is located either at the positive frequency or at the negative frequency, a separator module that separates the plurality of modulation signal components into real-part and imaginary-part signals, an optical modulator that modulates the plurality of modulation signal components using a single optical modulator to generate a modulated multi-carrier signal in an optical domain such that each carrier carries one of the multiple independent data channels, and a transmitter that transmits, the modulated signal to communicate the information to be transmitted.

In yet another aspect, an optical communication system is disclosed. The system includes an optical transmitter configured to generate a single sideband signal representation of information to be transmitted, wherein the information to be transmitted includes multiple independent data channels, perform digital signal processing on the single sideband signal representation to generate a plurality of modulation signal components, each modulation signal component is located either at the positive frequency or at the negative frequency, separate the plurality of modulation signal components into real-part and imaginary-part signals, modulate the plurality of modulation signal components using a single optical modulator to generate a modulated multi-carrier signal in an optical domain such that each carrier carries one of the multiple independent data channels, and transmit the modulated multi-carrier signal to communicate the information to be transmitted, The system includes an optical receiver that is configured to receive the transmitted multi-carrier signal, and individually recover information from each received carrier signal.

DETAILED DESCRIPTION

Software-defined optics (SDO) is becoming more common when it comes to the next-generation optical transmission technologies. SDO allows new features and capabilities to be added to existing systems without adding new hardware, minimizing the upgrade expense and maximizing the tradeoff between spectral efficiency and optical reach. The recent advent of digital-to-analog converters (DACs) at high sampling rates between 34 and 65 GSa/s is driving the implementation of SDO one step forward, and is attracting lots of attention in the industrial research communities.

Traditionally, Nyquist-Wavelength Division Multiplexing (N-WDM) and All-optical Orthogonal Frequency Division Multiplexing (AO-OFDM) are two candidate multi-carrier optical transmission techniques with high spectral efficiencies for future 400G/1T applications. Each channel is powered by one optical carrier or one wavelength. Typically generating m N-WDM or AO-OFDM channels requires m analog optical transmitters. (m≥2, integer). Each optical transmitter adds to hardware and software complexity due to the additional hardware and control software for operating the additional optical transmitter. Further, maintaining balance between multiple optical transmitters over variations in time and operating conditions adds additional complexity and/or inaccuracy to the implementation. By contrast, as further described below, the present document discloses techniques using which, among other things, a single digital optical transmitter can simultaneously generate m N-WDM or AO-OFDM channels.

The present document discloses, and describes, a digital approach that simultaneously generates two independent 30 Gbaud Nyquist sidebands per wavelength. In one advantageous aspect, this enables the delivery of dual-carrier 200 G PM-QPSK or 400 G PM-16 QAM solutions without additional carrier components. The reduced use of components can result in substantial saving in cost, footprint and power consumption of a dense wave division multiplexing (DWDM) system. The present document also discloses image-rejection of optical sidebands generation and the associated digital signal processing (DSP). Proof-of-concept experiment of 2×30 Gbaud PM-QPSK was carried out with enhanced Rx DSP to mitigate the strong filtering effect resulting from the limited DAC analog bandwidth.

Figure 1A:
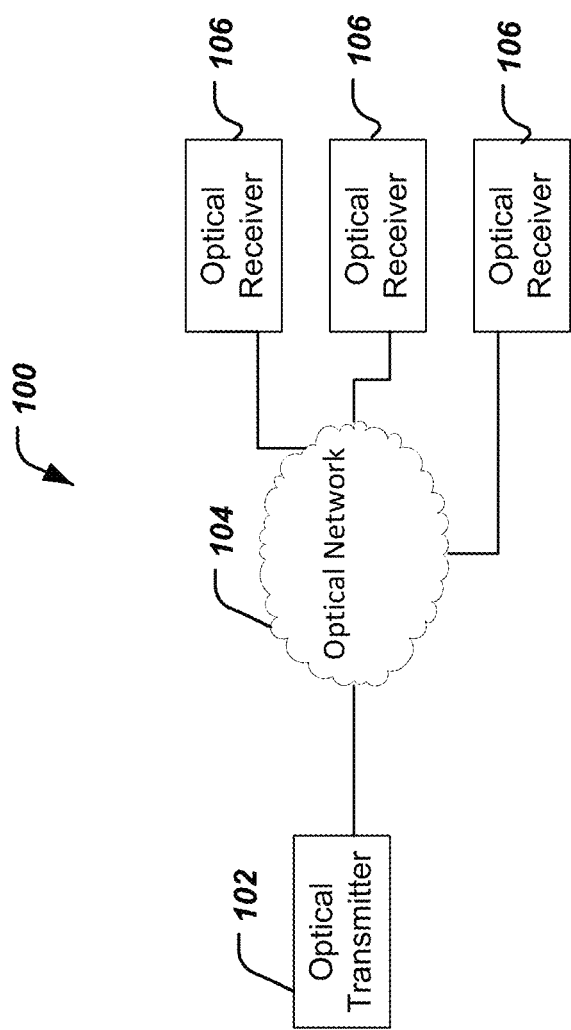
FIG. 1A depicts an example of an optical communication system.

FIG. 1A depicts an optical communication system 100 in which the presently disclosed technology can be practiced. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1A for clarity.

Figure 1B:
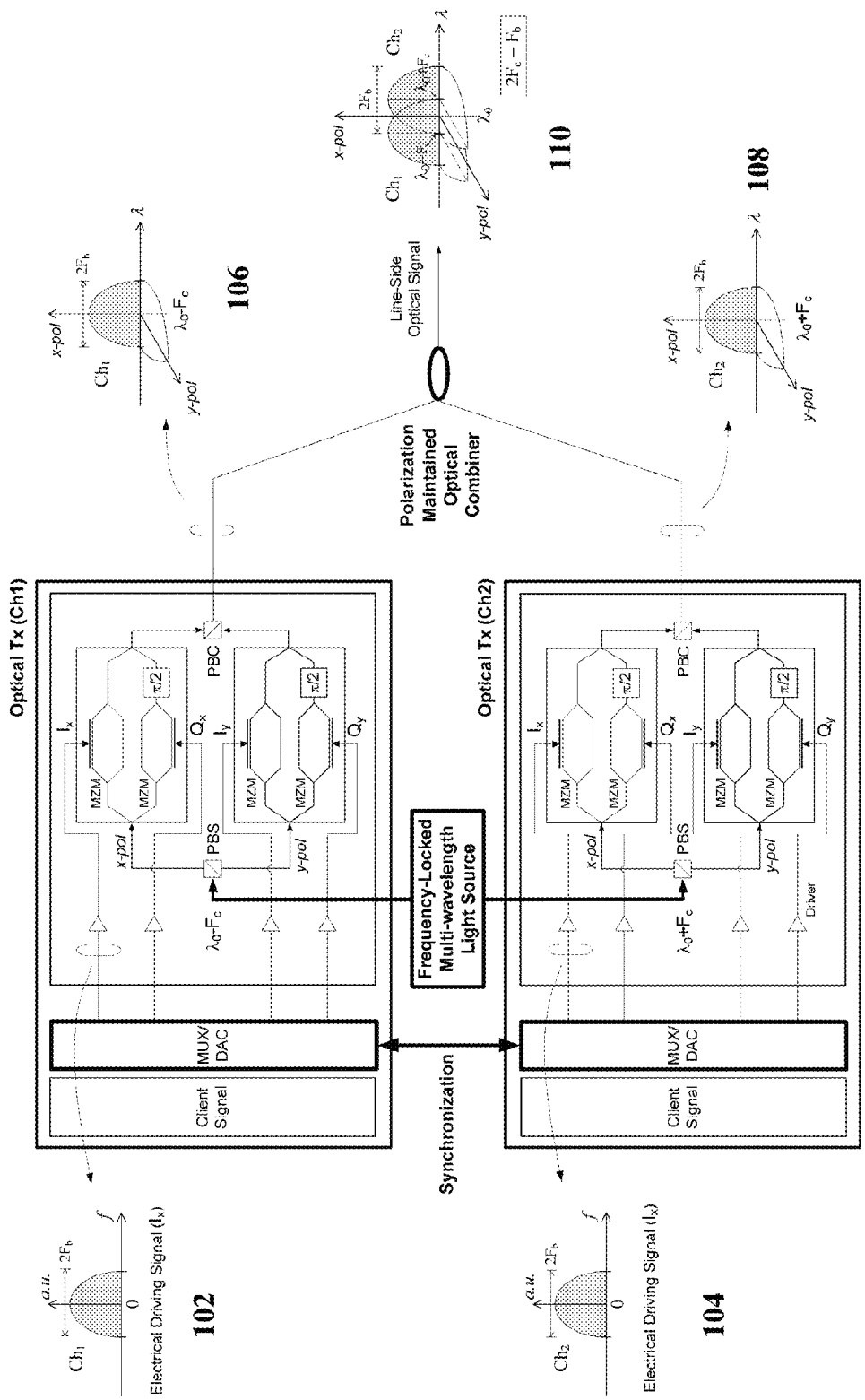
FIG. 1B is a block diagram example of an analog dual-carrier transmitter for an all-optical orthogonal frequency division multiplexing (AO-OFDM) signal.

FIG. 1B shows a traditional approach for generating an AO-OFDM signal. A two-carrier case is depicted. The modulation format of each optical channel is dual-polarization m-QAM, i.e., modulating m-QAM signals independently on the x- and y-polarization of a wavelength, and as illustrated there are two optical dual-polarization m-QAM transmitters for channel 1 (Ch1) and 2 (Ch2), respectively.

A typical dual-polarization m-QAM transmitter (Tx) consists of two IQ modulators (each composes of two nested Mach-Zehnder modulators (MZM) for modulating the x- and y-polarized lights, a polarization beam splitter (PBS), a polarization beam combiner (PBC), four drivers for the Ix, Qx, Iy, Qy driving signals, respectively, which are originally from a client signal, e.g., the information signal that is to be transmitted, and are separated into four tributaries (Ix, Qx, Iy, Qy) by using a multiplexer (MUX) or a digital-to-analog converter (DAC).

Under this method, to create orthogonality between two channels, two modulated optical channels/carriers are typically combined with the same symbol rates ($F_b$), and the amount of the channel/carrier spacing is set exactly identical to that of the symbol rate. Here three operational conditions are desirable: 1. the driving signals of Ch1 and Ch2 should be fully synchronized, and their optical output signals should be aligned 2. the input optical light to each optical Tx should be frequency-locked. For example, as illustrated the frequency-locked multi-wavelength light source has two output wavelengths, $\lambda_0-F_c$ and $\lambda_0+F_c$, for Ch1 and Ch2, respectively, and the wavelength spacing is $2F_c$, which equals to $F_b$. 3. the output of two transmitters should be co-polarized, and thus a polarization maintained optical combiner is required. These operational conditions may be hard to meet in practice.

The electrical spectra 102, 104 represent the Ix driving signals of Ch1 and Ch2, respectively. Without digital pulse shaping, and in principle the occupied bandwidth equals to $2F_b$. Spectra 106, 108 illustrate dual-polarization m-QAM optical signals for Ch1 and Ch2, respectively, and the combined AO-OFDM signal at the line side (110).

Figure 1C:
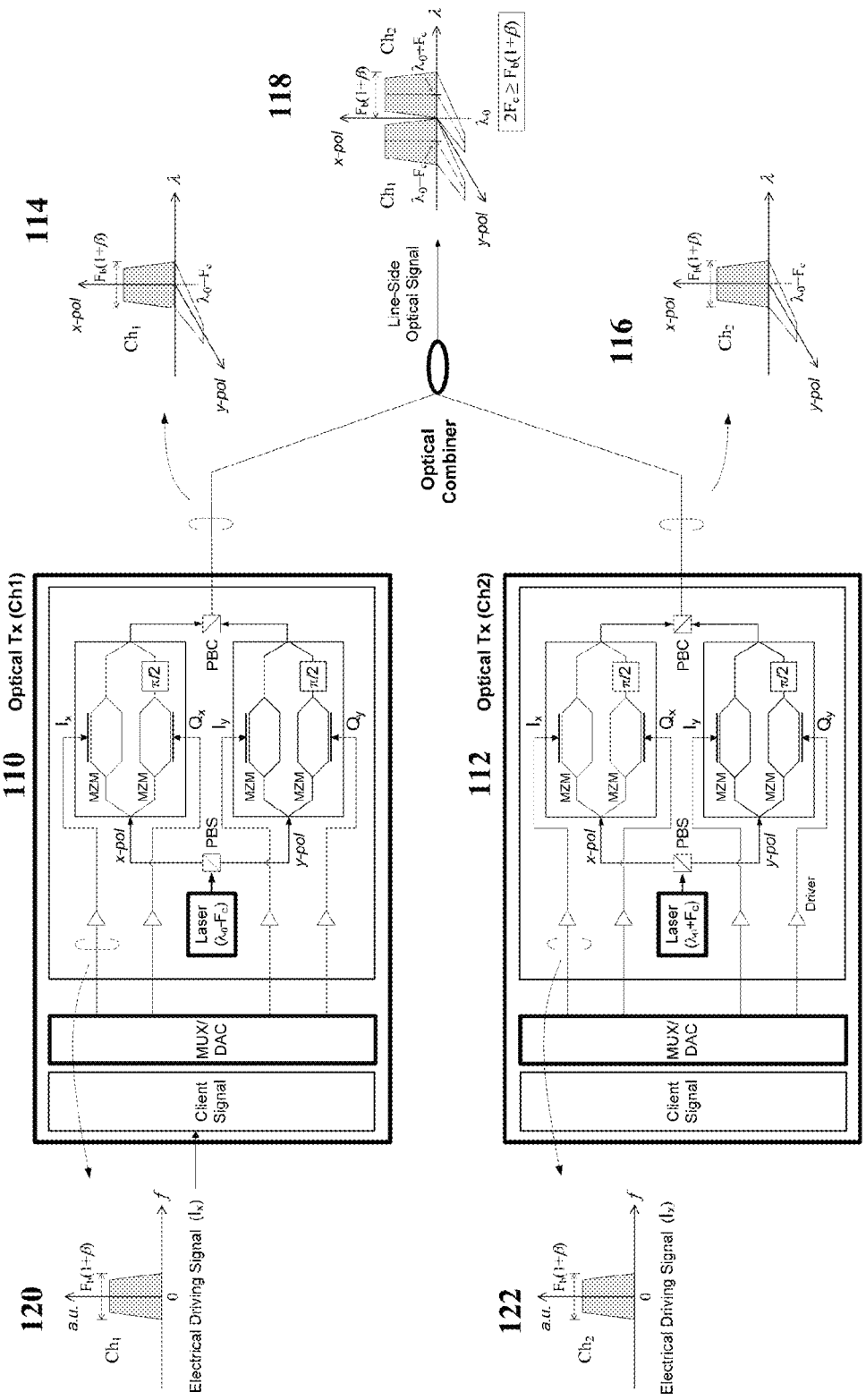
FIG. 1C is a block diagram example of an analog dual-carrier transmitter for Nyquist Wave Division Multiplexing signal.

FIG. 1C is a block diagram representation of a conventional analog dual carrier transmitter for Nyquist WDM. FIG. 1C shows a typical two-carrier Nyquist-WDM signal generation method. The modulation format and the structure of the optical Txs (110, 112) can be the same with those in depicted in FIG. 1B. As illustrated by the line-side optical signal output (118, which combines signals depicted in spectra 114 and 116), in principle Nyquist-WDM is meant to combine to Ch1 and Ch2 with a channel spacing 2 Fc no smaller than the occupied signal bandwidth of Fb(1+β) so that there is no spectrum overlap or crosstalk between channels.

Compared to AO-OFDM generation, Nyquist-WDM doesn't require orthogonality between channels, which means the synchronization and co-polarization between Ch1 and Ch2, and also the frequency-locked multi-wavelength light source are not needed. Therefore, individual lasers can be used for Ch1 and Ch2, and a regular optical combiner can be used to combined both channels.

Spectra 120, 122 show the driving signals for both channels, and spectra 114, 116 show individual Ch1 and Ch2 optical signals, and their combination (118). However, this method still requires one optical transmitter per carrier.

Figure 1D:
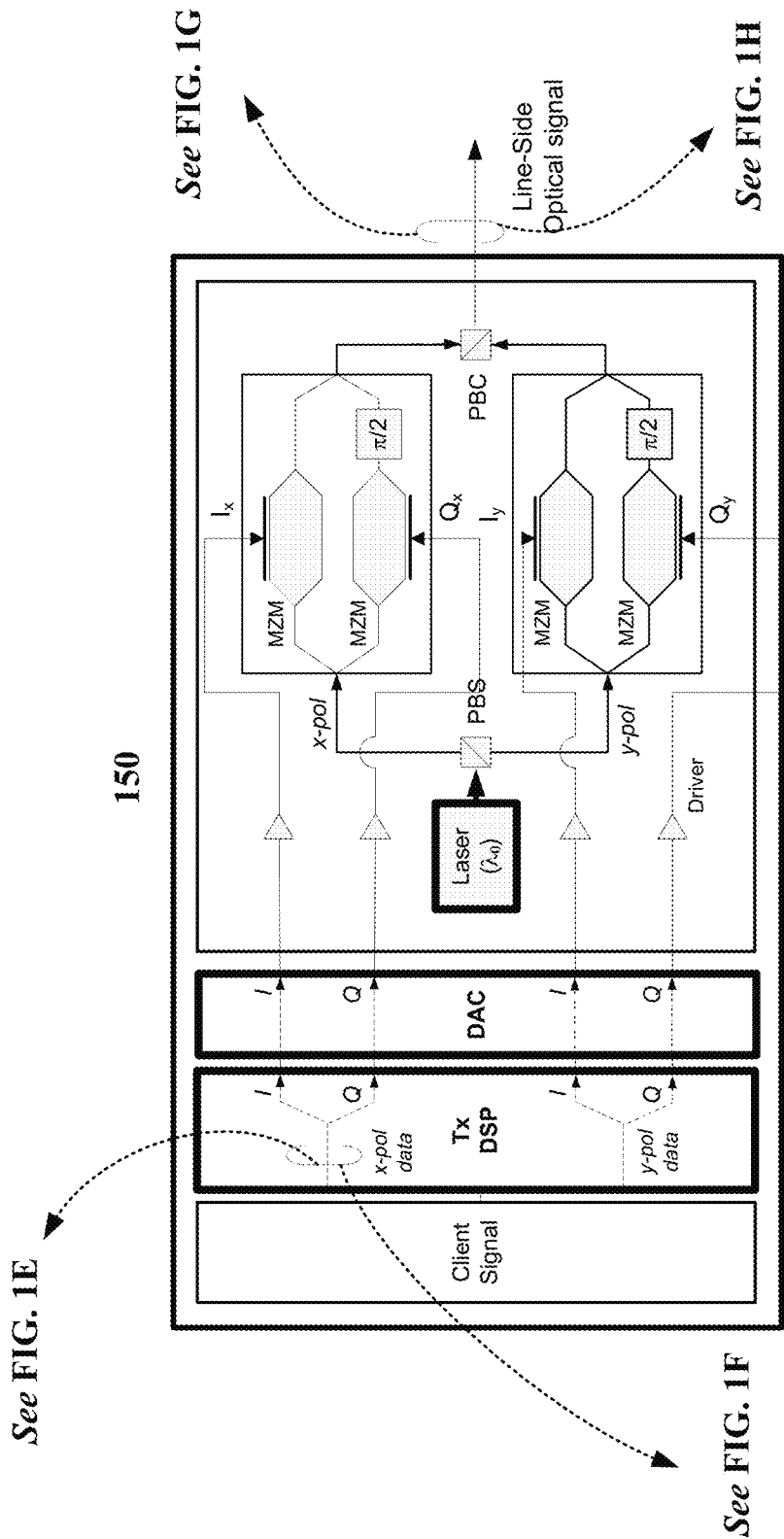
FIG. 1D is a block diagram example of a digital dual carrier transmitter.

FIG. 1D is a block diagram representation of a digital dual carrier transmitter 150 that uses a single optical source. Rather than optically combing two individual channels to create an N-WDM or AO-OFDM signal as described in the prior arts, the technique depicted in FIG. 1D, combines two channels in the digital/electrical domain first and then concurrently converts them to the optical domain.

Figure 1E:
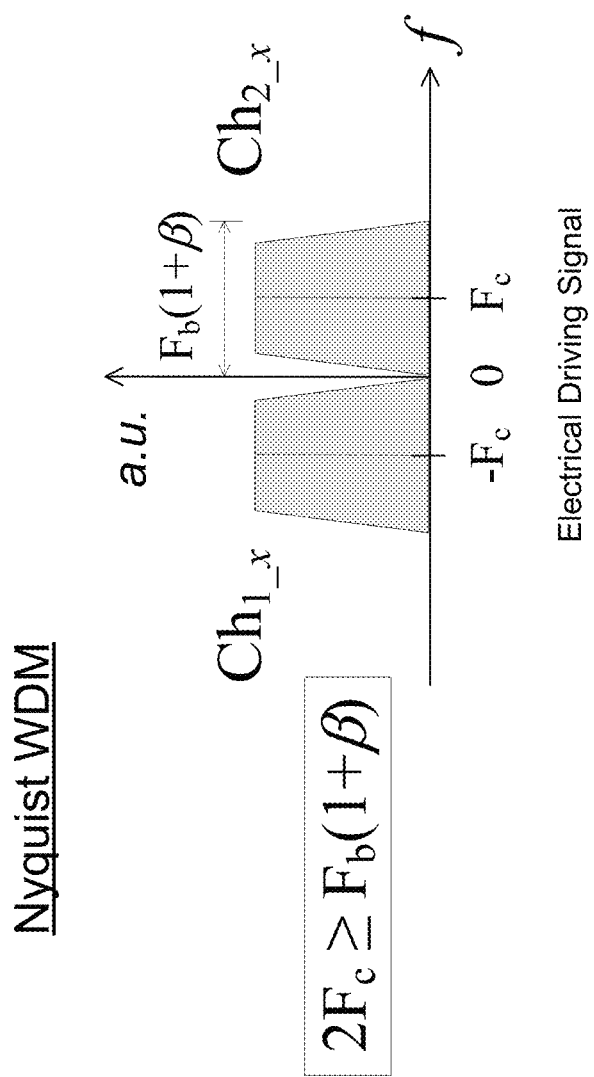
FIG. 1E is an example of spectrum of an electrical driving signal in transmitter example of FIG. 1D.
Figure 1F:
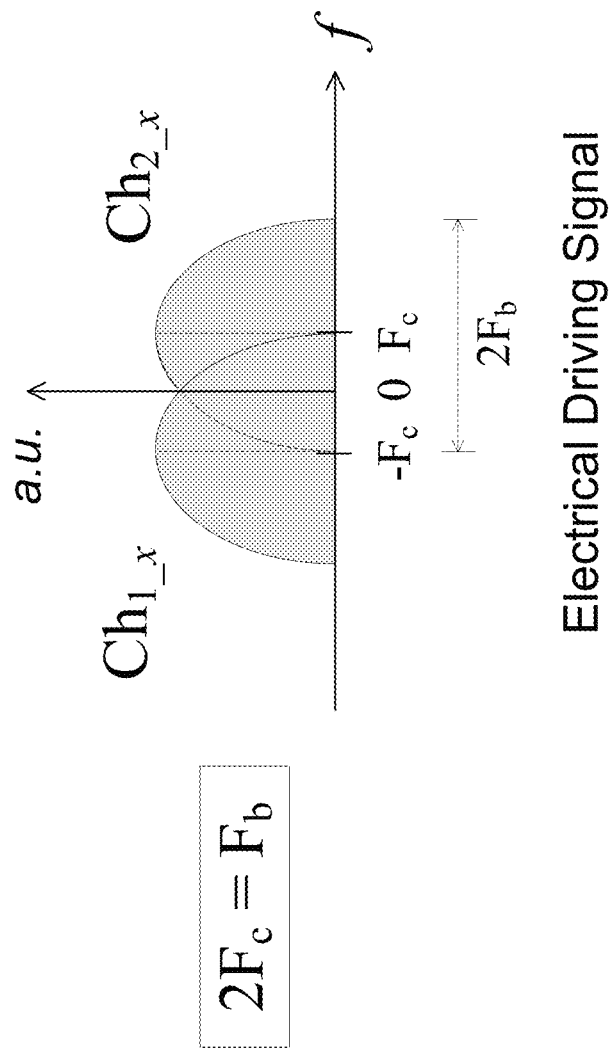
FIG. 1F is an example of spectrum of an electrical driving signal in transmitter example of FIG. 1D.
Figure 1G:
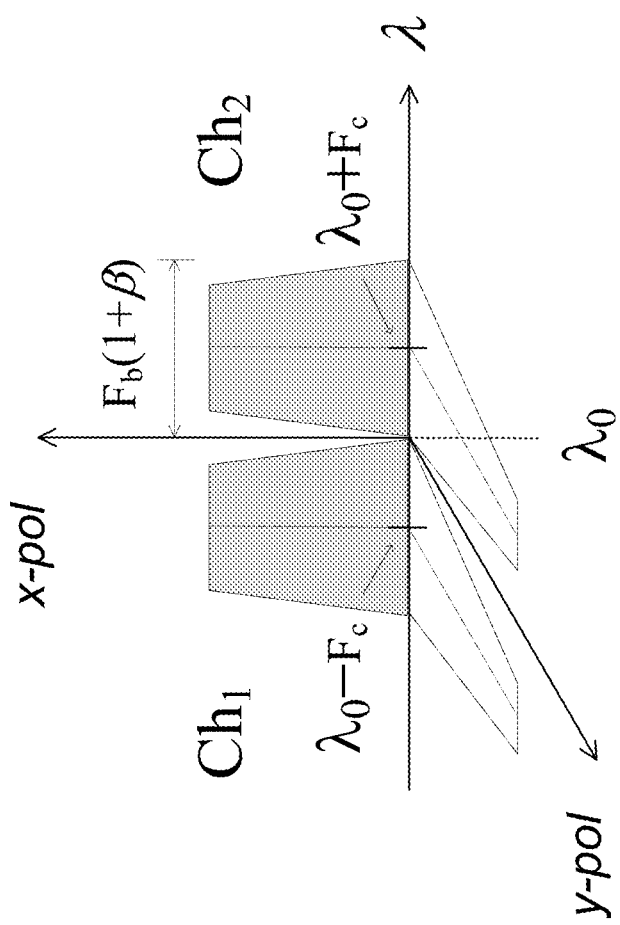
FIG. 1G is an example of spectrum of an optical signal in transmitter example of FIG. 1D.
Figure 1H:
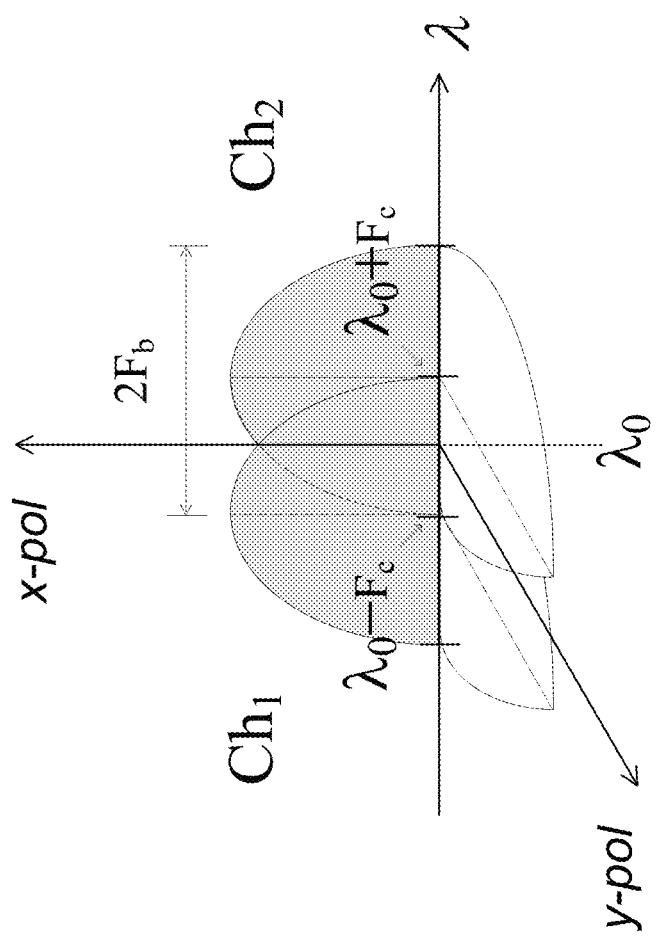
FIG. 1H is an example of spectrum of an optical signal in transmitter example of FIG. 1D.

In some embodiments, a high-speed DAC is used in cooperation with the transmitter digital signal processing. FIG. 1E and FIG. 1F illustrate spectra of a digital N-WDM signal having Ch1 and Ch2 at the negative and positive frequency bands (at the client signal side). This signal can be easily converted to an optical N-WDM signal. Similarly an AO-OFDM signal (FIG. 1F) can be realized as well. FIG. 1G and FIG. 1H represent the corresponding spectra of output optical signals.

As further disclosed below, compared to the previously discussed traditional N-WDM and traditional AO-OFDM, the scheme depicted in FIG. 1D can save on the system cost at the Tx side since now more than two channels can be generated by just one optical Tx. Also, the disclosed Tx embodiment is easily reconfigurable for either N-WDM to AO-OFDM transmission. In another advantageous aspect, compared to traditional AO-OFDM (FIG. 1B), both channels are always synchronized, aligned, and co-polarized in the optical domain.

Compared to the traditional N-WDM (FIG. 1C), since channel spacing 2 $F_c$ is defined in the digital domain, the implementation can be very stable in the optical domain after modulating the light from a single laser and the wavelength drafting of laser is not a concern. On the contrary, the channel spacing in traditional N-WDM scheme may vary since the channel spacing is given by difference of two individual wavelengths, from two individual lasers.

Image-Reject Optical Sidebands Generation

Figure 2A:
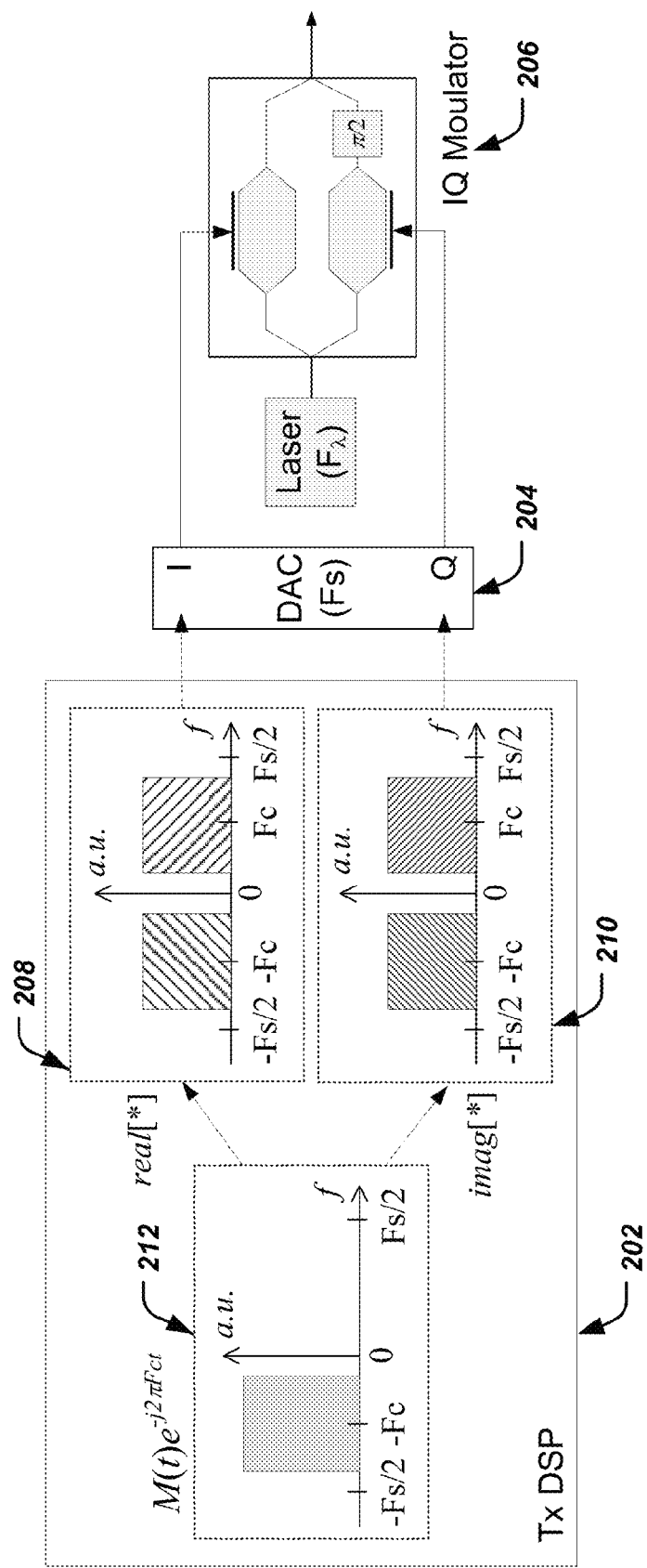
FIG. 2A depicts a block diagram example of DAC-enabled optical image-reject sidebands generation.

FIG. 2A is a block diagram depiction of an image-reject optical sidebands generation system. Three modules are depicted: a transmitter (Tx) DSP 202, digital-to-analog converter (DAC) 204 and optical IQ modulator 206. In the Tx DSP 202, it is assumed that a message signal M(t) is going to be delivered only at a lower sideband (LSB), i.e. at a negative intermediate frequency (IF) of Fc, without an image at the upper sideband (USB). An example spectrum of this signal is depicted in graph 212. Based on Hilbert transform, in order to satisfy the relationship between the real and imaginary signals for rejecting the image at the upper sideband (USB) during the signal up-conversion, one can simply modulate an IF carrier in form of a complex sinusoidal ($e^{-j2\pi F_c t}$), giving a lower sideband (LSB)-only signal $M(t)e^{-j2\pi F_c t}$ in the digital domain. In other words, the spectrum depicted in graph 212 could be considered to include two parts: a real part, represented by a spectrum (208) having a real-part signal at the negative frequency and its image the positive-frequency, and an imaginary part, represented by spectrum 210, having imaginary-part signal at the negative frequency and its image at the positive frequency. The phase and magnitudes of the real and imaginary parts are related so that in the negative frequency domain, the real and imaginary part add up, and in the positive frequency domain, the images of real and imaginary parts of a LSB signal cancel each other.

Next, the subsequent optical modulation stage is used to up-convert $M(t)e^{-j2\pi F_c t}$ to a laser frequency $F_\lambda$, while maintaining its complex sinusoidal nature. This can be achieved by the use of an optical IQ modulator 204 with its in-phase and quadrature-phase ports driven respectively by the real and the imaginary parts of $M(t)e^{-j2\pi F_c t}$ in the analog domain, by using a DAC with a sampling frequency of Fs. As illustrated in graphs 208, 210 and 212, taking the real and imaginary parts will turn the form of the digital IF from complex to real value, and thus create images at the USB. However, both will be rejected during the reconstruction of complex-sinusoidal IF via optical IQ modulation, giving an output of $M(t)e^{j2\pi(F_\lambda-F_c)t}$.

Figure 2B:
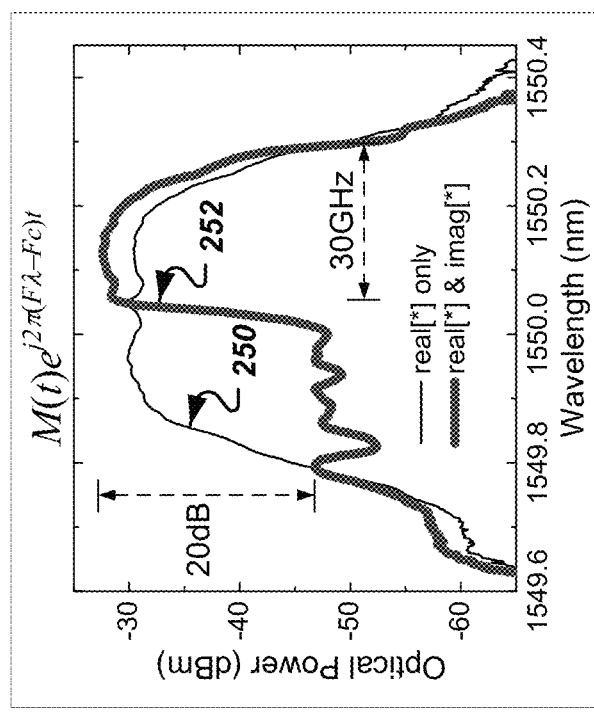
FIG. 2B depicts spectra of signals discussed in FIG. 2A embodiments.

FIG. 2B presents a measured optical spectra (0.01 nm RBW) of a 30 Gbaud optical LSB with (252) and without (250) the imaginary part of the driving signal. The image rejection ratio is about 20 dB. Ideally, such image-reject optical sidebands generation can be generalized to create more individual sidebands at various symbol rates within the Nyquist frequency boundary of {-Fs/2, Fs/2}. However, the best practice will have to tradeoff the number of sidebands and peak to average power ratio (PAPR) at the DAC output.

While the above description discusses embodiments in which signals modulated on two carriers are generated, it would be appreciated by one of skill in the art that a multi-carrier waveform can be similarly generated by operating the DAC on multiple image components of the desired output format.

Proof-of-Concept Setup and Results: 2×30 Gbaud PM-QPSK Sidebands

One of the applications of the presented image-reject optical sidebands generation is to deliver two commercial optical channels such as 100 G PM-QPSK or 200 G PM-16 QAM in whole digital way without doubling the quantities of key components such as lasers, drivers, optical IQ modulators, control and power supply circuitry, and etc. at the transmitter side, which translates directly to a tremendous saving of cost, footprint and power consumption from the perspective of DWDM or super-channel transmission.

Figure 3:
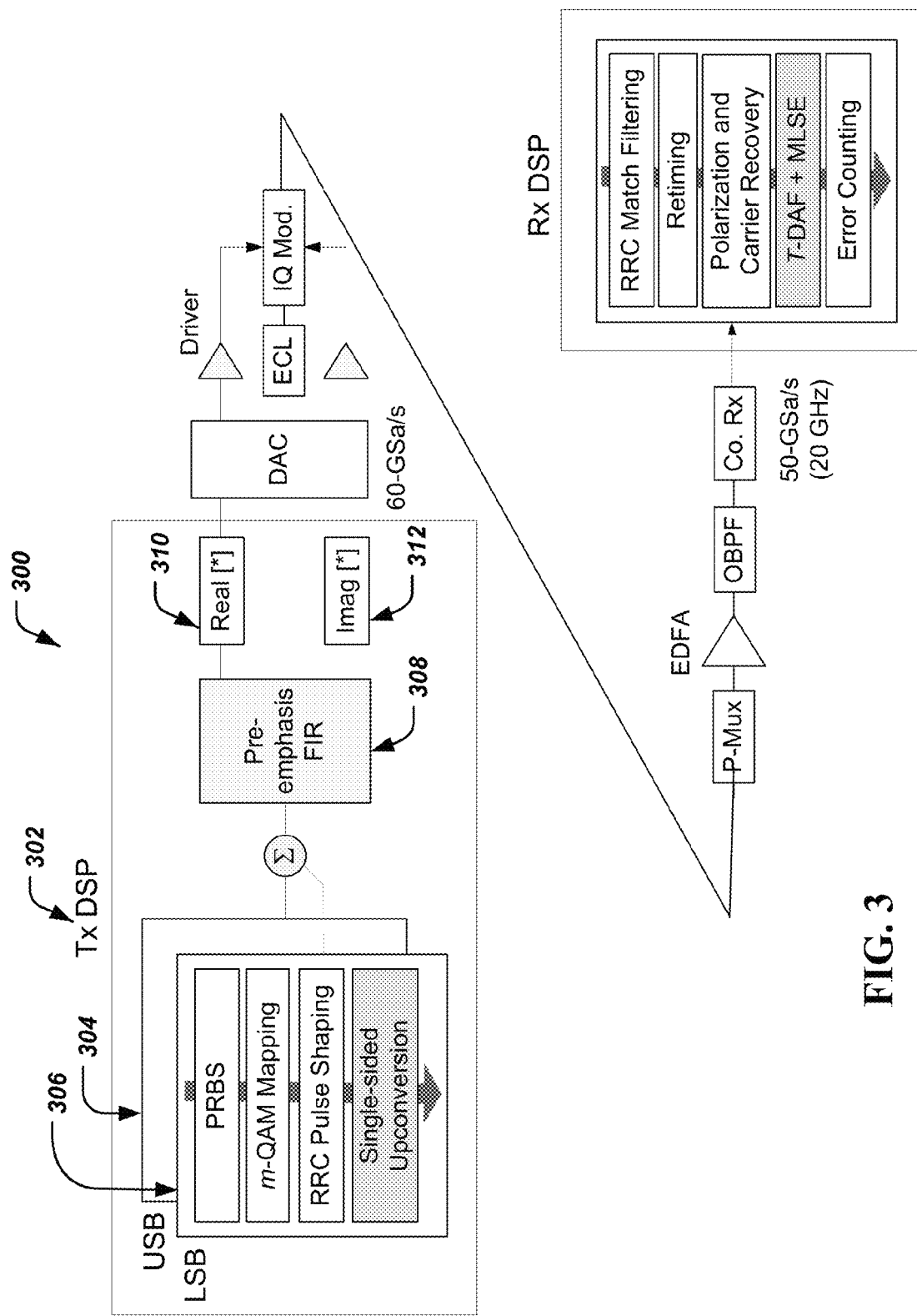
FIG. 3 depicts an experimental setup for digitally and simultaneously generating individual PM-m-QAM USB and LSB per wavelength at 30 Gbaud optical transmission.

FIG. 3 shows a proof-of-concept experimental setup for the digital generation of 2×30 Gbaud image-reject PM-QPSK optical sidebands. The Tx DSP comprises two signaling blocks for LSB (306) and USB (304), respectively. For the LSB, a pseudo-random binary sequence (PRBS) with a word length of $2^{15}-1$ was generated and mapped to create QPSK symbols. Given that the sampling rate of the DAC is 60 GSa/s, the QPSK symbols were convoluted with a zero-roll-off 256-tap root raised cosine (RRC) pulse shape filter at an oversampling rate of 2, resulting in a 30 Gbaud QPSK baseband signal. After that it was up-converted to the desired LSB at -15 GHz with the rejection of its image. Similarly the PRBS for the USB has the same word length but with a different seed, and the mapped and shaped QPSK symbols were up-converted to +15 GHz. There is no guard band inserted between two sidebands. The LSB and USB digital samples were summed up and were fed into a pre-emphasis FIR filter 308.

Figure 4:
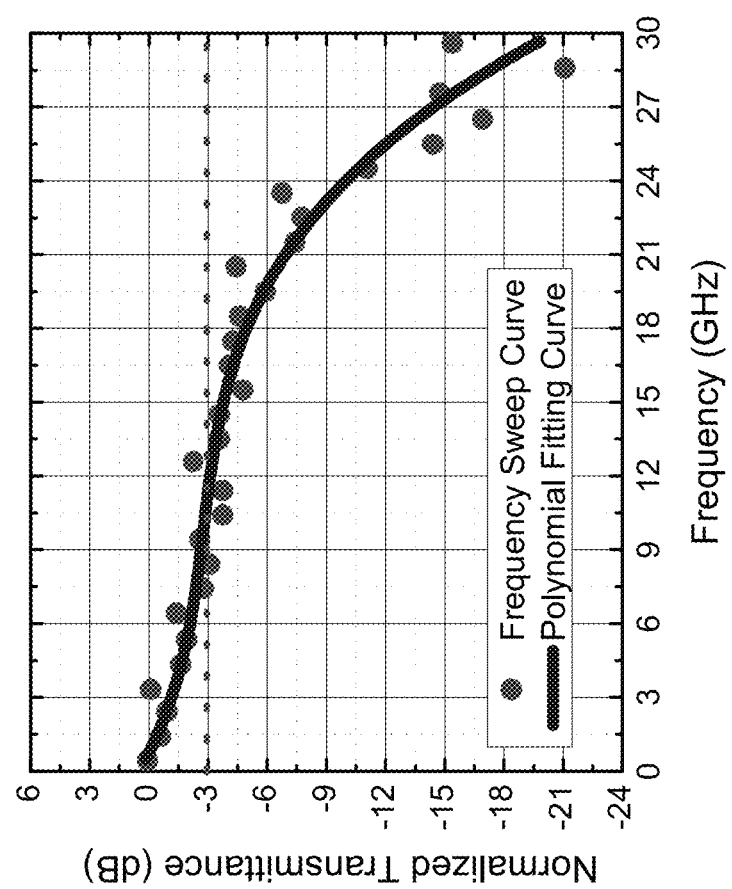
FIG. 4 depicts an example frequency response of DAC.

It may be useful to know or estimate the channel response prior to the pre-emphasis. In our work, it was measured by using the frequency sweep method. FIG. 4 depicts the normalized transmittance versus the swept frequencies. The -3 dB bandwidth of the DAC was around 12 GHz. Based on the frequency sweep curve one can obtain a polynomial fitting curve. Although from the fitting curve an infinite impulse response (IIR) filter can be designed to fully mimic the inversed channel response, we chose to use an FIR filter for the pre-emphasis since it is simple to be implemented and can be easily generalized to large inventory of DAC units.

The complex output of the pre-emphasis FIR filter was divided into real and imaginary parts 310 and 312. The signals 310 and 312 were up-loaded and assigned to different output ports of the DAC unit, which were boosted by high-linear drivers with 40-GHz analog bandwidth. The optical modulation included a 100-kHz external cavity laser (ECL), a 30-GHz optical IQ modulator and a polarization multiplexer (P-Mux). An EDFA was used for ASE loading and a 1nm-wide tunable optical band-pass filter (OBPF) was used to remove the excess ASE. The coherent receiver (Co. Rx) was operated at 50 GSa/s with a 20-GHz digitally-enhanced 3-dB bandwidth. Its 100-kHz LO was tuned and aligned with the carrier frequency of the LSB, and then we evaluated the performance of the LSB with and without the USB. In addition to those typical algorithms for PM-QPSK demodulation, in this particular experiment, we added an RRC matching filter after the re-sampling to suppress the in-band crosstalk from the USB and to enhance the SNR. The subsequent timing recovery was achieved by the classic squaring method. In addition, we observed that although pre-emphasis was added, both LSB and USB still suffered from a significant filtering effect due to the insufficient DAC bandwidth. This may lead to an undesired noise enhancement after the CMA equalizer. Thus, a T-spaced delay-and-add filter (T-DAF, T: symbol duration) was added after the carrier phase estimation to suppress that noise enhancement. Such T-DAF FIR filter also made possible the use of two-state maximum likelihood sequence estimation (MLSE) with a short memory length of 1. From the constellation point of view, the effect of this T-DAF digital filter turns the originally recovered 4-point QPSK to 9-point quadrature duobinary signals.

Figure 5B:
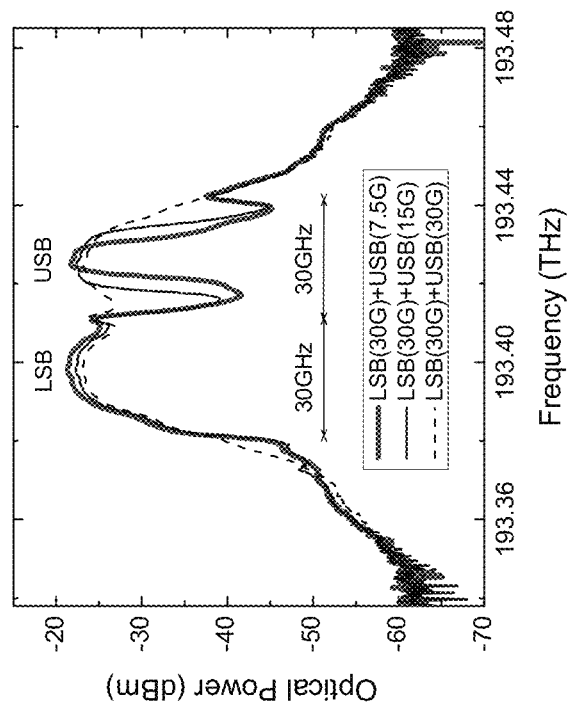
FIGS. 5A-5B depict spectra of dual image-reject sidebands at various symbol rates in digital domain (FIG. 5A, designed in Tx DSP) and optical domain (FIG. 5B, measured).
Figure 5A:
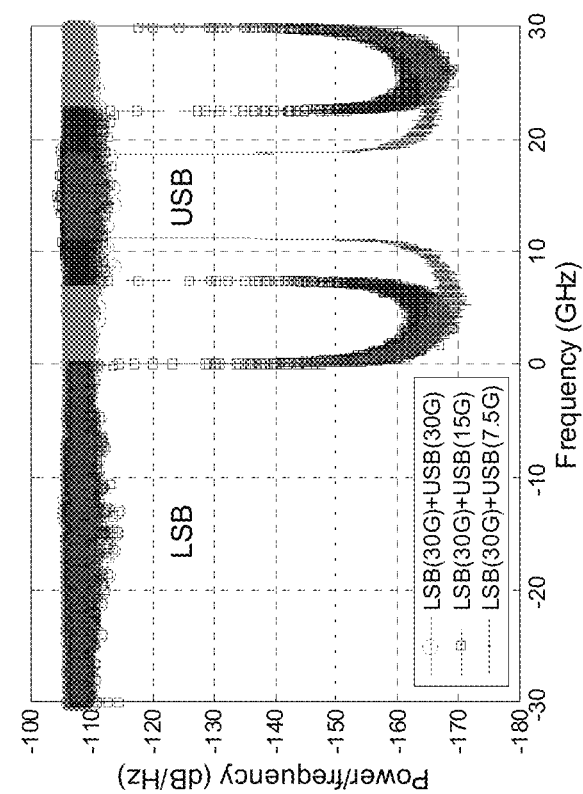

FIG. 5A shows the digital RF spectra of the dual image-reject sidebands generated in the offline Tx DSP 302, and the corresponding optical spectra (with 2 GHz resolution bandwidth, RBW) were measured and were illustrated in FIG. 5B. We kept the LSB symbol rate at 30 Gbaud while increasing that of the USB from 7.5 to 30 Gbaud. Both spectra looked consistent and clearly indicated that independent optical LSB and USB up to 30 Gbaud can be concurrently generated by using the disclosed scheme with their images entirely cancelled.

Figure 6:
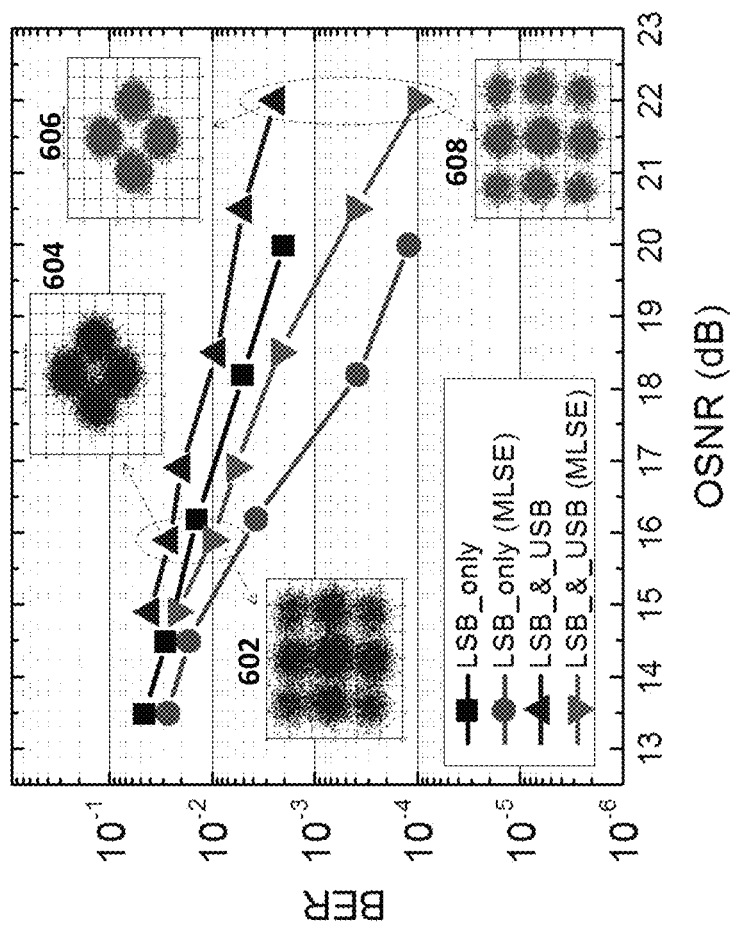
FIG. 6 depicts back to back bit error rate curves for the 30 Gbaud LSB with and without the 30 Gbaud USB and the use of MLSE, respectively.

FIG. 6 shows the back-to-back BER performance for the 30 Gbaud optical LSB. At the soft-decision pre-FEC BER limit of $2 \times 10^{-2}$, the required OSNR for the LSB without and with the USB are 15.37 dB and 16.86 dB, respectively. Both can be further reduced when the T-DAF and MLSE were involved at the Rx DSP, which are 14.18 dB and 15.04 dB, respectively. As a result, the use of T-DAF and MLSE gives a significant OSNR gain of 1.82 dB in the presence of both LSB and USB at 30 Gbaud with no guard band in between. The insets 602, 604, 606 and 608 provide an intuitive comparison between the received constellation diagrams for different cases at a given OSNR.

Figure 7:
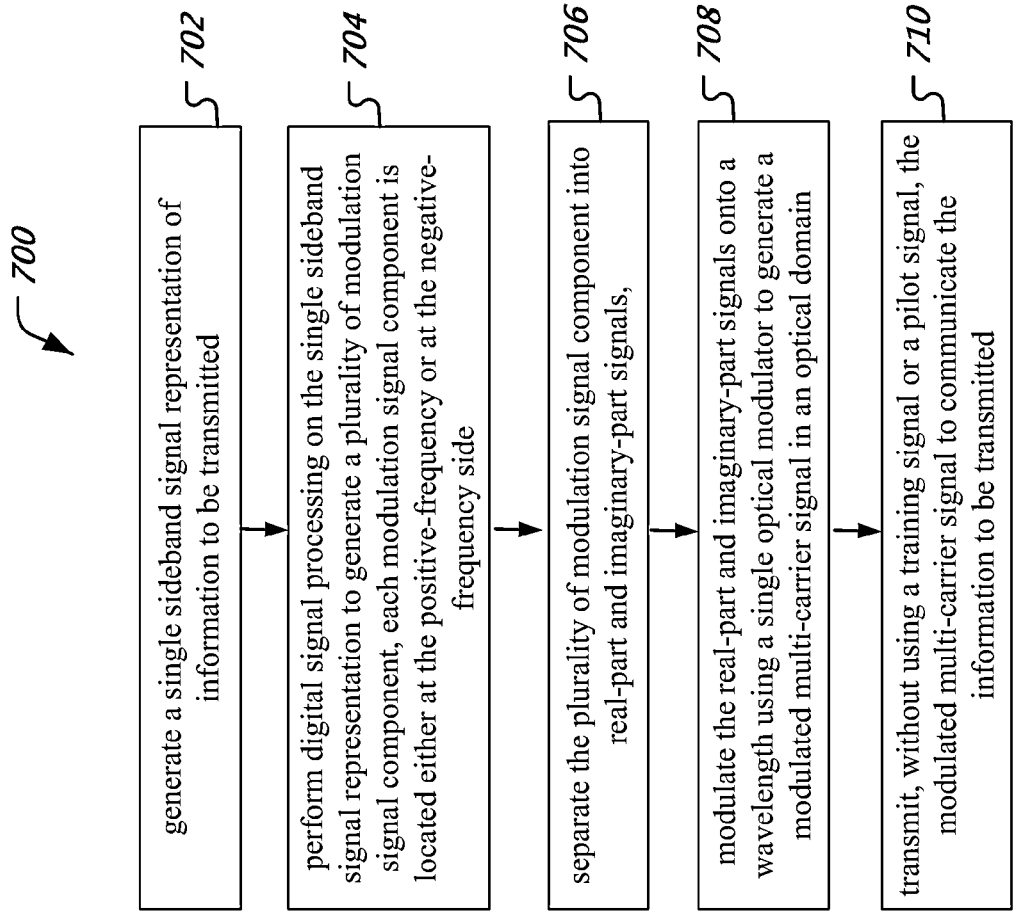
FIG. 7 is a flowchart representation of an example of a process of optical communication.

FIG. 7 is a flow chart representation of a process 700 of optical communications. The process 700 may be implemented at an optical transmitter (e.g., previously discussed apparatus 102, 104) to produce multi-carrier optical signals using a single optical transmitter.

At 702, the process 700 generates a single sideband signal representation of information to be transmitted. The information to be transmitted includes multiple independent data channels. As previously discussed, e.g., in FIG. 1D and FIG. 2A, the single sideband signal representation may comprise Nyquist WDM signals or AO-OFDM like signals (overlap between adjoining spectral lobes), with each WDM (or AO-OFDM) signal representing an independent data channel.

At 704, the process 700 performs digital signal processing on the single sideband signal representation to generate a plurality of modulation signal components, each modulation signal component is located either at the positive frequency or at the negative frequency but not both. As described with respect to FIG. 2A, the digital signal processing includes perform Hilbert transform filtering.

At 706, the process 700 considers the plurality of single sideband signals as a whole, and separates each signal into corresponding real and imaginary parts before optical modulation. The real-part signal will have both positive and negative frequency spectra that are symmetric while the spectra of the imaginary-part signal are anti-symmetric, respectively. In this context, anti-symmetry means same amplitude but 180 degree phase offset.

At 708, the process 700 modulates the plurality of modulation signal components using a single optical modulator to generate a modulated multi-carrier signal in an optical domain. The optical transmitter may both be modulated and also polarization domain multiplexed, as previously disclosed in this document. The process 700 operates such that each carrier carries one of the multiple independent data channels (that was used to generate the single side band signal).

At 710, the process 700 transmitting, the modulated multi-carrier signal to communicate the information to be transmitted, e.g., to a receiver device.

Figure 8:
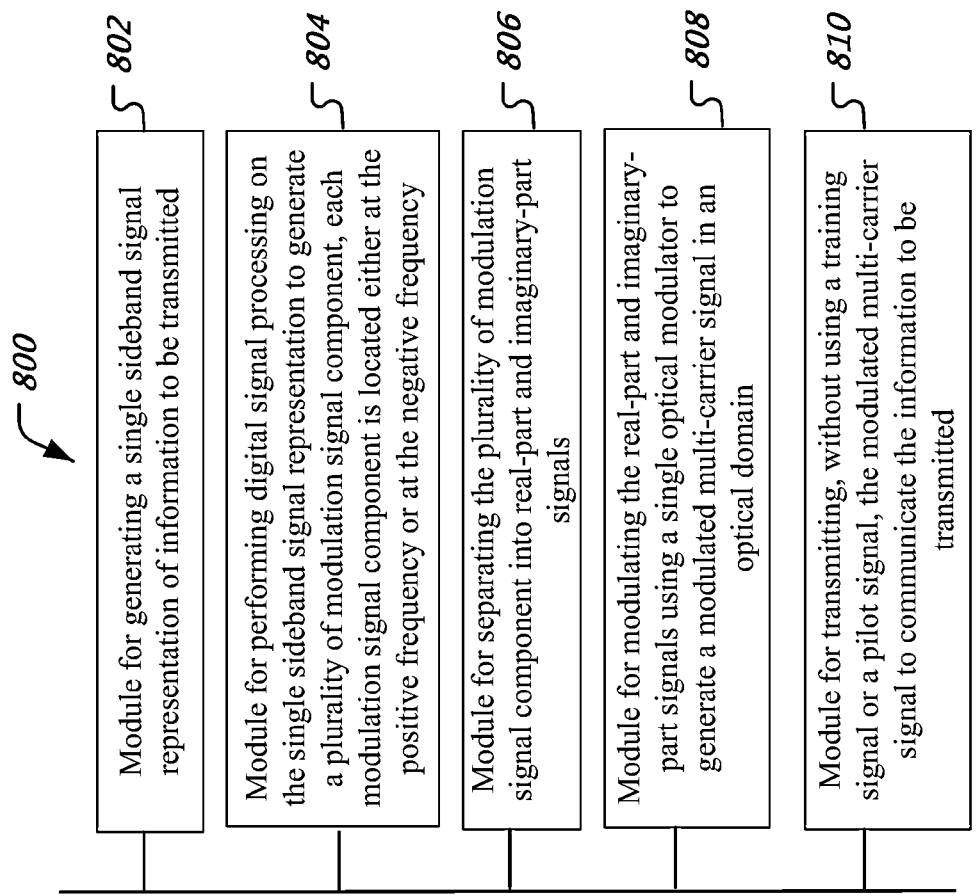
FIG. 8 is a block diagram representation of an example of an optical communication apparatus.

FIG. 8 is a block diagram representation of an optical communication apparatus 800. The module 802 is for generating a single sideband signal representation of information to be transmitted, wherein the information to be transmitted includes multiple independent data channels. The module 804 is for performing digital signal processing on the single sideband signal representation to generate a plurality of modulation signal components, wherein each modulation signal component is located either at the positive frequency or at the negative frequency (but not both). The module 806 is for separating the plurality of modulation signal components into real-part and imaginary-part signals. The module 808 is modulating the real-part and imaginary-part signals onto a wavelength by using a single optical modulator to generate a modulated multi-carrier signal in an optical domain such that each carrier carries one of the multiple independent data channels. The module 810 is for transmitting, the modulated multi-carrier signal to communicate the information to be transmitted. The apparatus 800 and modules 802, 804, 806, 808, 810 can be further configured to implement some of the techniques disclosed in the present document.

As part of the effort to establish the feasible SDO transmission technologies and increase the integration level, we conducted the first ever experimental demonstration by and simultaneously generating two 30 Gbaud image-reject sidebands on a single wavelength in a digital way, which is enabled by a high-speed DAC. Both the principle of the image-reject optical sidebands generation, and the DSP at Tx and Rx were presented and studied. For the generated 2×30 Gbaud LSB and USB carrying PM-QPSK at 4 bits/s/Hz with no guard band in between, the use of enhanced Rx DSP with T-DAF and MLSE gains 1.82 dB in the BTB OSNR requirement.

It will be appreciated that techniques are disclosed for generating multi-carrier/multi-channel optical signals using a single optical transmitter. In some embodiments, a two-carrier signal is generated by generating in-phase and quadrature components from a single sideband representation of signal to be modulated. The in-phase and quadrature components correspond to the real and imaginary parts of the single sideband spectrum. QPSK modulation is performed in the optical domain, with optional polarization domain multiplexing, to generate a two-carrier optical signal.

The disclosed and other embodiments, modules and the functional operations described in this document (e.g., a single sideband generation module, a digital signal processor, a separator module, an optical modulator, a transmitter, a pulse-shaping module, a pre-emphasis filter module, a PSK modulator, a Hilbert transform module, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of transmitting a multi-carrier optical signal, comprising:
    generating a single sideband signal representation of information to be transmitted, wherein the information to be transmitted includes multiple independent data channels;
    performing digital signal processing on the single sideband signal representation to generate a plurality of modulation signal components, wherein each modulation signal component is located either at the positive frequency or at the negative frequency;
    separating the plurality of modulation signal components into real-part and imaginary-part signals;
    modulating the real-part and imaginary-part signals onto a wavelength by using a single optical modulator to generate a modulated multi-carrier signal in an optical domain such that each carrier carries one of the multiple independent data channels; and
    transmitting the modulated multi-carrier signal to communicate the information to be transmitted.

2. The method of claim 1, further comprising:
    pulse-shaping the single sideband signal.

3. The method of claim 1, further comprising:
    applying a pre-emphasis filter prior to modulating using the single optical modulator.

4. The method of claim 1, wherein the modulating comprises:
    phase modulating the plurality of modulation signal components such that each component corresponds to a modulation phase.

5. The method of claim 1, wherein the performing digital signal processing comprises Hilbert transform filtering the single sideband signal representation.

6. An apparatus for transmitting a multi-carrier optical signal, comprising:
    a single sideband generation module that generates a single sideband signal representation of information to be transmitted, wherein the information to be transmitted includes multiple independent data channels;

a digital signal processor that generates a plurality of modulation signal components, each modulation signal component is located either at the positive frequency or at the negative frequency;

a separator module that separates the plurality of modulation signal components into real-part and imaginary-part signals;

an optical modulator that modulates the plurality of modulation signal components using a single optical modulator to generate a modulated multi-carrier signal in an optical domain such that each carrier carries one of the multiple independent data channels; and a transmitter that transmits the modulated signal to communicate the information to be transmitted.

7. The apparatus of claim 6, further comprising:
a pulse-shaping module that pulse-shapes the single sideband signal.

8. The apparatus of claim 6, further comprising:
a pre-emphasis filter module that applies a pre-emphasis filter prior to modulating using the single optical modulator.

9. The apparatus of claim 6, wherein the optical modulator comprises a phase shift keying modulator such that each component corresponds to a modulation phase.

10. The apparatus of claim 6, wherein the digital signal processor comprises a Hilbert transform module that filters the single sideband signal representation.

11. A computer program product comprising a non-transitory computer-readable storage medium having code stored thereon, the code, when executed, causing a processor to implement a method of transmitting a multi-carrier optical signal, the method comprising:

generating a single sideband signal representation of information to be transmitted, wherein the information to be transmitted includes multiple independent data channels;

performing digital signal processing on the single sideband signal representation to generate a plurality of modulation signal components, wherein each modulation signal component is located either at the positive frequency or at the negative frequency;

separating the plurality of modulation signal components into real-part and imaginary-part signals;

modulating the real-part and imaginary-part signals onto a wavelength by using a single optical modulator to generate a modulated multi-carrier signal in an optical domain such that each carrier carries one of the multiple independent data channels; and transmitting the modulated multi-carrier signal to communicate the information to be transmitted.

12. The computer program product of claim 11, wherein the method further comprises:
pulse-shaping the single sideband signal.

13. The computer program product of claim 11, wherein the method further comprises:
applying a pre-emphasis filter prior to modulating using the single optical modulator.

14. The computer program product of claim 11, wherein the method further comprises:
Hilbert transform filtering the single sideband signal representation.

15. An optical communication system comprising an optical transmitter and an optical receiver, wherein
the optical transmitter is configured to:
generate a single sideband signal representation of information to be transmitted, wherein the information to be transmitted includes multiple independent data channels;

perform digital signal processing on the single sideband signal representation to generate a plurality of modulation signal components, each modulation signal component is located either at the positive frequency or at the negative frequency;

separate the plurality of modulation signal components into real-part and imaginary-part signals;

modulate the plurality of modulation signal components using a single optical modulator to generate a modulated multi-carrier signal in an optical domain such that each carrier carries one of the multiple independent data channels; and transmit the modulated multi-carrier signal to communicate the information to be transmitted; and the optical receiver is configured to receive the transmitted multi-carrier signal, and individually recover information from each received carrier signal.

* * * * *